Aug. 12, 1952     M. IRWIN ET AL     2,606,578
DEVICE FOR CLEANING CUTTING BLADES
Filed May 27, 1948     2 SHEETS—SHEET 1
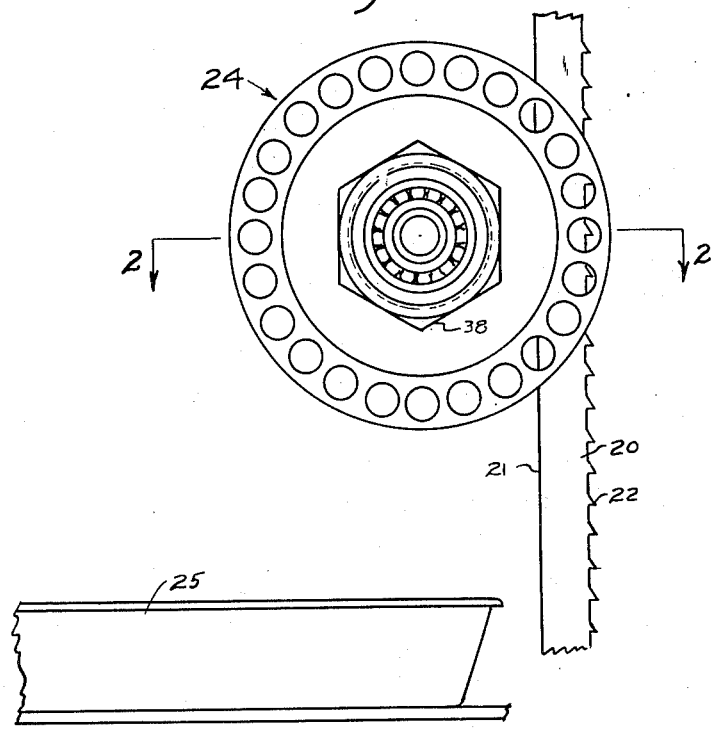
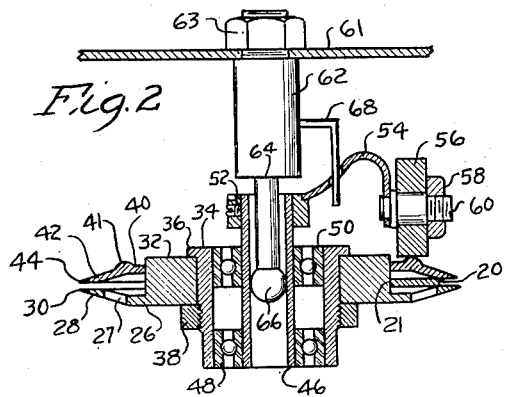
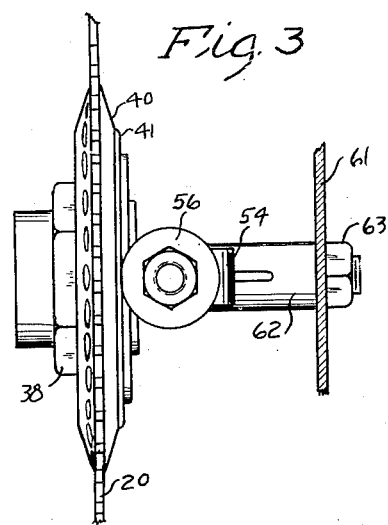
INVENTOR.
MILTON IRWIN
GERALD W. FEIKER
BY
Attorney Aug. 12, 1952 M. IRWIN ET AL 2,606,578
DEVICE FOR CLEANING CUTTING BLADES
Filed May 27, 1948 2 SHEETS—SHEET 2
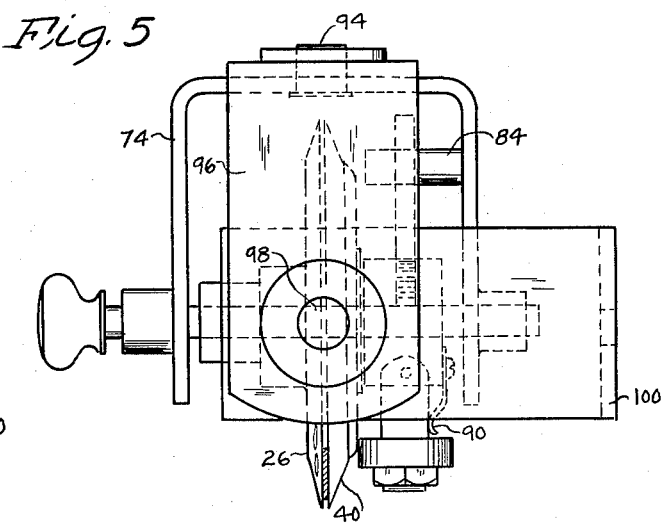
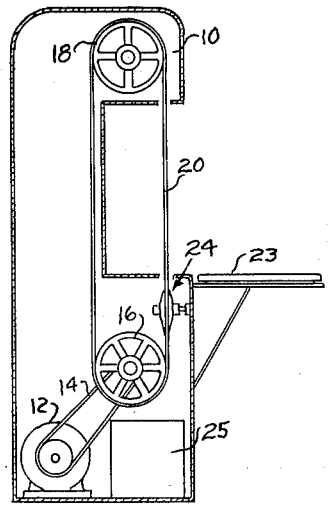
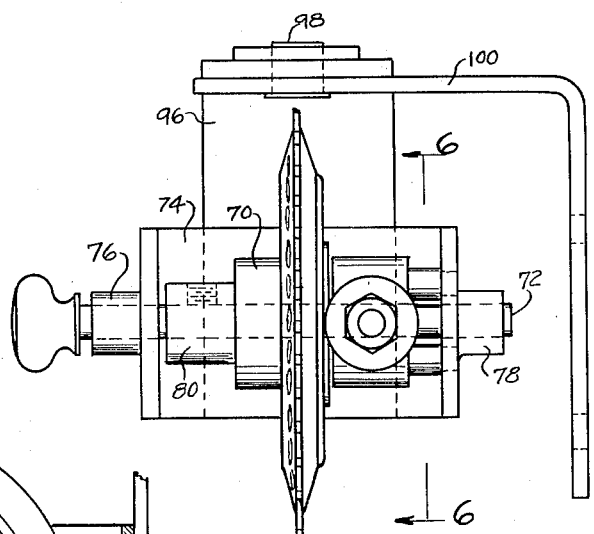
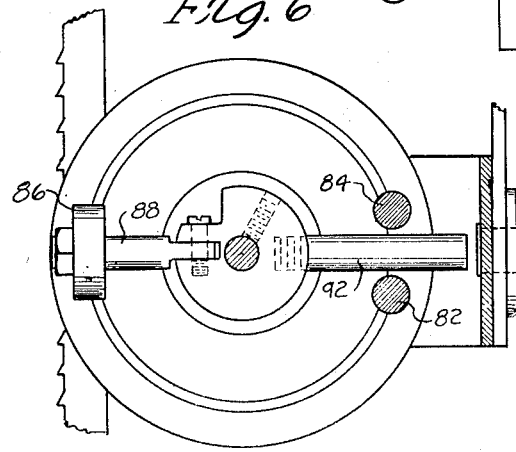
INVENTOR.
MILTON IRWIN
GERALD W. FEIKER
BY *F. A. Whiteley*
Attorney Patented Aug. 12, 1952

2,606,578

UNITED STATES PATENT OFFICE 2,606,578

DEVICE FOR CLEANING CUTTING BLADES

Milton Irwin and Gerald W. Feiker,
Minneapolis, Minn.

Application May 27, 1948, Serial No. 29,487

2 Claims. (Cl. 143—158)

Our invention relates to improvements in a device for cleaning a cutting blade. In particular, it relates to an attachment for use with a power saw for removing residual material picked up by the saw blade in performing a cutting operation.

In the modern practice of handling meat in packing houses and also in wholesale and retail meat establishments, it is customary to use a power saw for the single operation of cutting through both the meat and the bone. This is equally true whether the saw is used for large sections of the carcass or for individual pieces such as steaks, chops or roasts. In some instances the blade may be reciprocated, but it is a general practice to use a circular band saw for this purpose. In either instance, however, the blade has a strong tendency to pick up and carry a considerable amount of residual tissue, bone and fat during the cutting operation. Primarily it is important to remove this residual material to prevent it from being re-deposited on the substance being cut. This is particularly important in cutting meat, and more so when a certain amount of fat is present. Secondly, it is important to remove this residual material to prevent it from diminishing the efficiency of the mechanism which will be caused by the transfer of material from the blade to the pulleys or other structure that drives the blade.

In the present invention a device for cleaning the residual material from the blade is provided in the form of a pair of freely rotatable disks that are positioned on either side of the blade and held in contact therewith so as to be rotated by the movement of the blade. Each of the disks is formed with a bevelled surface at its outer periphery to form an inclined surface which will permit the residual material to be readily transferred from the blade and between its teeth to one or the other of the disks as the blade moves relative to the disks along a line which is tangent to the periphery of the disks. As the saw blade is generally formed of thin, highly tempered metal, it is quite resilient, and will have a certain amount of uncontrolled movement resulting from its resilient nature. Because of this uncontrolled movement it becomes necessary to support the cleaning device in such a manner that the latter can freely move in unison with the blade and thus avoid any binding action upon the blade, which might cause its destruction. The disks are, therefore, supported on a floating support operating like a sliding gimbal mount so that they will follow the blade through any of its lateral or distorted movements without binding.

An object of our invention is to provide a device for removing residual material from a cutting blade and includes a pair of members positioned on either side of the blade and which are rotatable in the same plane as the blade and are constructed to perform a cleaning operation as the blade moves relative to the members.

Another object is to provide a saw blade cleaning device which includes a pair of disks mounted in side-by-side relation on either side of a saw blade and resiliently held in contact with the blade so as to be rotated by the movement of the blade to remove the residual material from the blade by a shearing action.

Another object is to provide a pair of disks adapted to be positioned on either side of a moving blade and resiliently held in contact with the blade so as to be rotated thereby to remove residual material from the blade and dispose of the same by centrifugal action of the disks.

Another object is to provide a cutting blade cleaning device which includes a pair of bevelled disks positioned in parallel relation with each other on opposite sides of the blade, together with means for supporting the disks which will permit their free rotation and will also permit them to be moved laterally or angularly so that they can follow the blade through lateral or angular movement.

A further object is to provide a blade cleaning device which includes a pair of freely rotatable disks having bevelled edges that are adapted to be positioned on opposite sides of a cutting blade, together with means for biasing one of the disks against the blade and the other disk in such a manner as to cause the disks to be rotated on their central axes by relative movement of the blade, and the equivalent of a gimbal support for the disks to enable them to have freedom of movement to follow the blade through lateral distortions.

Other and further objects may become apparent from the following description and claims, and in the appended drawings in which:

Fig. 1 is a side elevation of a cutting blade cleaning device forming the invention and showing its relationship to a saw blade;

Fig. 2 is a section taken on the lines 2—2 of Fig. 1 showing portions of the device in cross-section;

Fig. 3 is a side elevation of the structure shown in Fig. 1 as seen from the right side thereof;

Fig. 4 is a modification of the device shown in Figs. 1–3;

Fig. 5 is a top plan view of the structure shown in Fig. 4;

Fig. 6 is a section taken on the lines 6—6 of Fig. 4; and,

Fig. 7 is a view in side elevation of a power saw showing the manner in which the present invention is applied to the saw.

Referring to the several views of the drawing, the invention will now be explained in detail. Referring first to Fig. 7, is shown a power saw of the type frequently used in the meat industry for severing carcasses into individual elements such as steaks or chops, suitable for sale to the trade. Reference numeral 10 indicates a casing in which is mounted a motor 12 that supplies power through a belt 14 to a driving pulley 16. A second driving pulley 18 is mounted in the upper portion of casing 10. Suitably extending over pulleys 16 and 18 is a continuous band saw 20, having a smooth rear edge 21 and a plurality of cutting teeth 22 on its forward edge. A movable platform 23 is positioned on the outside of the casing to support a piece of meat or other substance to be cut, and is moved relative to the band saw 20 in performing the cutting operation. A blade cleaning device indicated by general reference numeral 24 is supported on the interior of casing 10 immediately below the supporting platform and is used to remove residual material from the blade and dispose of the same into a container 25.

Referring now to Figs. 1, 2 and 3, the cleaning device indicated by general reference numeral 24 in Fig. 7 will be explained in detail. A cylindrical disk 26 having a plurality of apertures 27 therein is formed with a bevelled edge 28 on one face which tapers to a relatively thin edge 30. On its opposite face, disk 26 has a cylindrical shoulder 32. Disk 26 is mounted on a tubular support 34 having a shoulder portion 36, and disk 26 is held against shoulder portion 36 by a nut 38. A second disk 40 having a ridge 41 on its outer surface is also provided with a bevelled edge 42 that extends to a relatively thin point 44. Disk 40 is loosely mounted on shoulder portion 32 of disk 26. It will be evident by examination of the drawings that disk 40 is in reality a flat ring, but the important feature of the invention is that the two disks are positioned in side-by-side relation to each other and have substantially equal overall dimensions. The two disks are adapted to receive between their inner surfaces the saw blade 20 with the rear edge 21 of the blade in contact with shoulder portion 32 of disk 26 and the teeth 22 slightly within the peripheries of the disks.

The two disks 26 and 40 and the tubular support 34 are mounted on a tubular structure 46 and separated therefrom by a pair of roller bearings 48 and 50, which permit disk 26 to freely rotate on its central axis. As previously mentioned, disk 40 is loosely mounted on shoulder 32 and, therefore, it is also freely rotatable about its central axis.

An annular support 52 is loosely mounted on tubular member 46 and has secured thereto a spring 54. Spring 54 in turn supports a roller element 56 that engages ridge 41 of disk 40 and is held in place by nut 58 and bolt 60. The function of roller 56 and spring 54 is to bias disk 40 in the direction of blade 20 and disk 26 so that the two disks will be rotated by the frictional contact with the blade when the latter is moving.

Rigidly mounted on a flat surface 61 (Figs. 2 and 3), which is a portion of the casing 10 shown in Fig. 7, is a supporting device 62 secured by a nut 63 and having a rod 64 extending from its inner end. Rod 64 is of such dimension as to pass into the interior of tubular member 46 and on its inner end is provided with a ball point 66 that engages the inner surface of tubular member 46. An abutment 68 is secured to support 62 and engages a portion of spring 54 to prevent rotative movement of spring 54 and roller 56 in unison with the disks 26 and 40.

The operation of the device shown in Figs. 1–3 and 7 will now be explained in detail. The cleaning device 24 is rigidly supported on casing 10 beneath the cutting platform 23 in such a manner that it is operative to clean the saw blade 20 immediately after the cutting operation has taken place. The device is positioned with disk 26 on one side of the blade and disk 40 on the opposite side of the blade. This may be accomplished by removing nut 38 and placing the disks on either side of the blade after which nut 38 is replaced. When in place the outer edges 30 and 44 extend slightly beyond the points of teeth 22. Roller 56 is resiliently held in contact with the ridge 41 on disk 40 by means of spring 54 and biases disk 40 against the saw blade 20 and disk 26. When the saw blade 20 is placed in operation by motor 12, it travels at a very high rate of speed, which in most power saws amounts to as much as approximately 2,500 feet per minute. When the meat or other substance is passed relative to the saw blade 20, its teeth 22 will tend to carry a certain amount of residual material in the form of tissue, bone or fat. When the saw is used for cutting meat, the blade 20 and its teeth 22 will pick up a considerable amount of the material being cut. As the blade passes tangentially through the disks, two actions take place. First, the sharp edges of the disks tend to move the material forward and onto the bevelled edges of the disks, and secondly, any remaining material is squeezed out through the apertures 27 of disk 26. Because the saw blade generally moves at a very high rate of speed, often about 2,500 feet per minute, the disks are driven at a very fast rate so that the material picked up by the disks is thereafter centrifugally thrown in the direction of container 25.

It frequently occurs in the use of a band saw that the blade will be subject to vibration or lateral movement that may be occasioned in the cutting operation. This vibration or movement must not be allowed to cause a binding action between the blade 20 and the cleaning device 24. To prevent this, the entire rotatable structure as well as the biasing means are supported on tube 46 in such a manner that they can freely move in a lateral direction on rod 64 because the entire structure is slidably mounted on rod 64 and is not secured to the mounting member 62 by any permanent fastening. Should the blade 20 have any tendency to move in an angular direction, tube 46 and the parts mounted thereon can also move angularly on the ball point 66 of rod 64. Thus it should be clearly understood that the two disks 26 and 40 will be supported similarly to a gyroscope, and the supporting structure is intended to provide a floating support that will permit freedom of movement of the disks both in an angular and a lateral direction.

Referring now to Figs. 4–6 is shown a modified means of supporting the disks 26 and 40 to provide lateral and angular movement. In this disclosure disk 26 is mounted on a tubular member 70 which through anti-friction means similar to bearings 48 and 50 is suitably mounted on a rod 72. Rod 72 is mounted in a U-shaped member 74 by means of a pair of bearings 76, 78, but is laterally slidable in the bearings so as to have a small amount of lateral movement. Collar 80 is mounted on one side of tubular element 70 and between it and one wall of the U-shaped member 74 to limit the movement of the disks 26 and 40 in one direction, and a pair of lugs 82 and 84, see Figs. 5 and 6, are mounted on the opposite wall of U-shaped member 74 to limit the movement of the disks in the opposite direction as shown in Fig. 5. A roller 86, similar in all respects to roller 56, is supported on a rod 88, Fig. 6, and is resiliently biased against disk 40 by a spring 90, shown in Fig. 5. A rod 92 extends between lugs 82 and 84 to prevent rotation of the roller 86, and in general serves the same function as member 68 in Fig. 2.

The U-shaped member 74 is pivotally mounted at 94 to a bracket 96, which bracket is also pivotally mounted at 98 to a bracket 100. The purpose of members 74, 96 and 100 are to provide a pivotal floating support for the disks 26 and 40 and serves substantially the same purpose as the junction between the ball point 66 of rod 64 and the interior of tubular member 46 of Fig. 2.

The operation of the structure of Figs. 4-6 is substantially the same as that previously disclosed except that in the disclosure of Figs. 1-3 the two disks 26 and 40 are held in place by the saw blade 20 while in Figs. 4-6 the disks are held in the U-shaped member 74 by the lugs 82, 84 on one side and collar 80 on the opposite side, but like the preceding disclosure, the two disks are capable of a certain amount of limited lateral movement within the U-shaped member 74, and the floating movement is available through the pivotal connections 94 and 98 that will permit angular movement of members 74 and 96 relative to bracket 100.

The advantages of the present invention reside in providing a pair of freely rotatable disks that are resiliently held in contact with a saw blade and provide a simple and efficient means of removing residual material from the blade and its teeth during the cutting operation.

A further advantage in the present device is in the manner of mounting the disks so as to provide freedom of movement in several directions so that they do not constitute a binding element on the blade which might cause its destruction.

Our invention is defined in the terms of the appended claims.

We claim:

1. A cutting blade cleaner, comprising a first disk having a cylindrical shoulder formed on one face thereof, a second disk positioned in parallel relation to the first disk and supported on the shoulder portion thereof, resilient means for biasing the second disk in the direction of the first disk, a tube extending through the central axis of said first disk, antifriction means positioned between said first disk and said tube to provide free rotation of the disk with respect to said tube, supporting means adapted for attachment to a wall surface, and a rod extending from said supporting means into the interior of said tube, said rod having a ball point which engages the inner periphery of said tube providing the equivalent of a slidable gimbal joint between the tube and the support whereby said disks are permitted a limited degree of freedom of movement in a plurality of directions.

2. A saw blade cleaner, comprising a first support, a pair of cooperating saw blade cleaning members carried by said support and positioned on opposite lateral sides of a saw blade, means for biasing one of said members in the direction of the other member to hold said members in contact with the opposite lateral sides of the blade, said support having an internal cylindrical opening, a second support adapted for attachment to a wall surface, a rod of smaller diameter than such cylindrical opening extending from said second support into the opening in the first named support, and a spheroid of larger diameter than the rod on said rod which extends into said opening and engages the side walls thereof providing the equivalent of a slidable gimbal joint between said supports to permit freedom of movement between the first and second supports.

MILTON IRWIN.
GERALD W. FEIKER.

REFERENCES CITED

The following references are of record in the file of this patent:

UNITED STATES PATENTS

| Number | Name | Date |
| --- | --- | --- |
| 307,678 | Parish | Nov. 4, 1884 |
| 334,175 | Kratzer | Jan. 12, 1886 |
| 337,647 | Allington | Mar. 9, 1886 |
| 659,088 | McKenzie | Oct. 2, 1900 |
| 1,086,074 | Newell | Feb. 3, 1914 |
| 1,272,892 | Baur | July 16, 1918 |
| 1,494,774 | Davis | May 20, 1924 |
| 2,059,595 | McKeage | Nov. 3, 1936 |